United States Patent [19]
Robinson

[11] Patent Number: 6,119,541
[45] Date of Patent: Sep. 19, 2000

[54] METHODS FOR ADJUSTING A LEAD SCREW NUT AND A NUT FOR ADJUSTABLY ENGAGING A LEAD SCREW

[75] Inventor: Keith Robinson, Boise, Id.

[73] Assignee: Micron Electronics, Inc., Nampa, Id.

[21] Appl. No.: 09/275,980

[22] Filed: Mar. 25, 1999

[51] Int. Cl.[7] .................................................. F16H 55/18
[52] U.S. Cl. ...................... 74/441; 74/89.15; 74/424.8 R
[58] Field of Search .................................. 74/441, 89.15, 74/424.8 R

[56] References Cited

U.S. PATENT DOCUMENTS

| | | | |
|---|---|---|---|
| 5,732,596 | 3/1998 | Erikson et al. | 74/441 |
| 5,839,321 | 11/1998 | Siemons | 74/441 |
| 6,041,671 | 3/2000 | Erikson et al. | 74/441 |

*Primary Examiner*—David Fenstermacher
*Attorney, Agent, or Firm*—Perkins Coie LLP

[57] ABSTRACT

An adjustable nut for mounting a movable working assembly to a lead screw having a longitudinal axis and a thread, and methods for adjusting lead screw nuts. In one embodiment, the adjustable nut has a first member, a second member and an adjustment assembly. The first and second members of this embodiment are configured to threadably engage the thread on the lead screw. The second member can be coupled to the first member to prevent relative rotation between the first and second members, and to allow axial displacement between the first and second members along the longitudinal axis of the lead screw. The adjustment assembly of this embodiment includes a biasing element coupled to the first and second members to exert an axial drive force with respect to the longitudinal axis of the lead screw that drives the first and second members apart from one another. The biasing element of this embodiment is selectively adjustable to increase or decrease the axial drive force without disassembling the biasing element from the first or second member. In another embodiment, the adjustment assembly further includes a third member threadably engaged with the second member. In this embodiment, the first member has a first contact surface and the third member has a second contact surface facing the first contact surface. The biasing element extends between the first and second contact surfaces to exert the axial drive force against the first and second contact surfaces. The third member can be rotated with respect to the second member to move the second surface axially with respect to the first surface for increasing or decreasing the axial drive force exerted by the biasing element.

32 Claims, 7 Drawing Sheets

METHODS FOR ADJUSTING A LEAD SCREW NUT AND A NUT FOR ADJUSTABLY ENGAGING A LEAD SCREW

TECHNICAL FIELD

The invention is directed to an adjustable nut and methods for adjusting a lead screw nut, and, more particularly, to a nut that adjustably engages a thread on a lead screw.

BACKGROUND OF THE INVENTION

Machining equipment and assembly equipment often incorporate movable components that position workpieces and/or tool pieces with respect to one another at a processing station. FIG. 1, for example, generally illustrates a processing station 20 having a table 22 for supporting a workpiece (not shown). The table 22 typically moves along at least one axis of a conventional Cartesian X-Y-Z coordinate system to position the workpiece relative to a tool piece (not shown) for processing.

To move the table along one of the X-Y-Z axes, the table 22 can be driven by a lead screw 24 and a lead screw nut 26. The lead screw 24 is typically an elongated rod having an external thread 30, and the lead screw nut 26 typically has a bore with an internal thread 28 engaged with the external thread 30 on the lead screw 24. Rotating the lead screw 24 with respect to the lead screw nut 26 accordingly moves the lead screw nut 26 axially along the longitudinal axis of the lead screw 24. The lead screw nut 26 is typically fixedly attached to the table 22 such that clockwise rotation of the lead screw 24 moves the table 22 in one direction, and counter-clockwise of the lead screw 24 moves the table 22 in the opposite direction.

The lead screw 24 is generally coupled to a motor 32, such as a servo motor, to rotate the lead screw 24. An operator controlling the motor 32 can control the rotational speed and linear displacement of the lead screw 24. Thus, by closely controlling the rotational motion of the lead screw 24, the operator can precisely control the velocity and position of the table 22 relative to a tool piece at a processing station.

One drawback of conventional lead screw assemblies is that there can be a significant amount of play between the external thread 30 of the lead screw 24 and the internal thread 28 of the lead screw nut 26. In many applications, the threads on the lead screw 24 and the lead screw nut 26 wear down so that the thread forms are not in constant contact with each other. As a result, the lead screw 24 typically rotates a number of degrees before the external thread 30 on the lead screw engages the internal thread 28 on the lead screw nut 26 and moves the table 22. This problem is particularly noticeable when the operator changes the direction of the table 22. The play, or lack of positive engagement between the threads 28 and 30, reduces the precision of the equipment 20.

FIGS. 2 and 3 illustrate a two-part, hourglass-shaped nut 32 that addresses this problem. The hourglass-shaped nut 32 includes a first part 34, a second part 36 and a plurality of wedges 38 that drive the first and second parts away from each other to maintain constant contact between the hourglass-shaped nut 32 and the lead screw 24 (FIG. 3).

As illustrated in FIG. 3, the first part 34 has a first threaded hole 40, a conical first surface 42 and a plurality of first tabs 43 projecting from the first surface 42. Similarly, the second part 36 has a second threaded hole 44, a conical second surface 46 and a plurality of second tabs 47 projecting from the second surface 46. When the first and second tabs 43 and 47 are interlocked to axially align the first threaded hole 40 with the second threaded hole 44, the first and second conical surface 42 and 46 form a V-shaped groove around the perimeter of the hourglass-shaped nut 32. The first and second tabs 43 and 47 also prevent relative rotation between the first and second parts 34 and 36.

Each wedge 38 is configured to be closely received within the V-shaped groove. For example, each wedge 38 has a curved external surface 48 that generally follows the perimeters of the first and second parts 34, 36. Each wedge 38 also has a groove 50 in the external surface 48. The hourglass-shaped nut 32 typically has four wedges 38 that fit into the V-shaped groove defined by the first and second conical surfaces 42 and 46 to form a moveable wedge assembly with an annular groove 50.

During operation, the first and second parts 34 and 36 are joined by interlocking the first and second tabs 43 and 47. The assembly of the first and second parts 34 and 36 is then threaded onto the lead screw 24, and the wedges 38 are inserted into the V-shaped groove in contact with the first and second conical surfaces 42 and 46. A ring-shaped, helical spring 52 is then stretched over the hourglass-shaped nut 32 and positioned into the annular groove 50 to draw the wedges 38 into the V-shaped groove. The spring 52 and the wedges 38 accordingly push the first part 34 away from the second part 36 to constantly drive the internal threads of the first and second parts 34 and 36 against the external thread 30 of the lead screw 24.

The hourglass-shaped nut 32, however, may not work well after a period of time because the external thread 30 on the lead screw 24 may not wear evenly. The thread forms of the external thread 30 will generally be thinner along sections that frequently contact the hourglass-shaped nut 32 than those that seldom contact the nut. When the hourglass-shaped nut 32 passes over a highly worn portion of the lead screw 24, spring 52 and wedges 38 drive the first and second parts 34, 36 apart from one another to maintain positive contact with the external thread 30. Yet, when the hourglass-shaped nut 32 is then moved to a lesser-worn portion of the lead screw 24, the spring 52 prevents the wedges 38 from moving radially outward so that the first and second parts 34, 36 can move toward one another to compensate for the thicker thread forms of the external thread 30. The effective pitch of the internal threads of the first and second parts 34, 36, as defined by the relative positions of these parts, accordingly does not mate with the larger, lesser-worn thread forms of the external thread 30. As a result, resistance between the hourglass-shaped nut 32 and the lead screw 24 increases over lesser-worn portions of the lead screw 24 and may even cause the hourglass-shaped nut 32 and the lead screw 24 to seize together.

To release the hourglass-shaped nut 32 from lesser-worn sections of the lead screw 24, the hourglass-shaped nut 32 is generally disassembled to reposition the wedges 38 in the V-shaped groove so that the first and second parts 34, 36 can be moved toward one another. This solution, however, is only temporary because the first and second parts 34, 36 will spread apart from one another over the highly-worn section of the lead screw 24. The only other solution is to replace the lead screw 24, which can be time consuming and adversely affect productivity.

SUMMARY OF THE INVENTION

The present invention is directed toward an adjustable nut for mounting a movable working assembly to a lead screw having a longitudinal axis and a thread, and methods for adjusting a lead screw nut. In one embodiment, the adjustable nut has a first member, a second member and an adjustment assembly. The first and second members of this embodiment are configured to threadably engage the thread on the lead screw. The second member can be coupled to the first member to prevent relative rotation between the first and second members, and to allow axial displacement between the first and second members along the longitudinal axis of the lead screw. The adjustment assembly of this embodiment includes a biasing element coupled to the first and second members to exert an axial drive force with respect to the longitudinal axis of the lead screw that drives the first and second members apart from one another. The biasing element of this embodiment is selectively adjustable to increase or decrease the axial drive force without disassembling the biasing element from the first or second member.

In another embodiment, the adjustment assembly further includes a third member threadably engaged with the second member. In this embodiment, the first member has a first contact surface and the third member has a second contact surface facing the first contact surface. The biasing element extends between the first and second contact surfaces to exert the axial drive force against the first and second contact surfaces. The third member can be rotated with respect to the second member to move the second surface axially with respect to the first surface for increasing or decreasing the axial drive force exerted by the biasing element.

During operation, the adjustable nut moves along the length of the lead screw. The axial drive force urges the first and second members apart to maintain constant, positive contact between the adjustable nut and the lead screw. This constant contact reduces "play" between the lead screw and the nut to provide precise control of the working assembly. As the lead screw wears, the size and shape of the thread may change along its length. Because the axial drive force of the biasing element can be adjusted without disassembling the biasing element from the first and second members, the working assembly can be positioned along both lesser-worn and greater-worn portions of the lead screw without the resultant cost or delay associated with disassembling the apparatus.

DETAILED DESCRIPTION OF THE INVENTION

The present detailed description is generally directed toward adjustable nuts for mounting movable work assemblies to lead screws, and methods for adjusting the lead screw nuts. Many specific details of certain embodiments of the invention are set forth in the following description and in FIGS. 4–8 to provide a thorough understanding of such embodiments. One skilled in the art, however, will understand that the present invention may have additional embodiments, or that the invention may be practiced without several of the details described in the following description.

Figure 4:
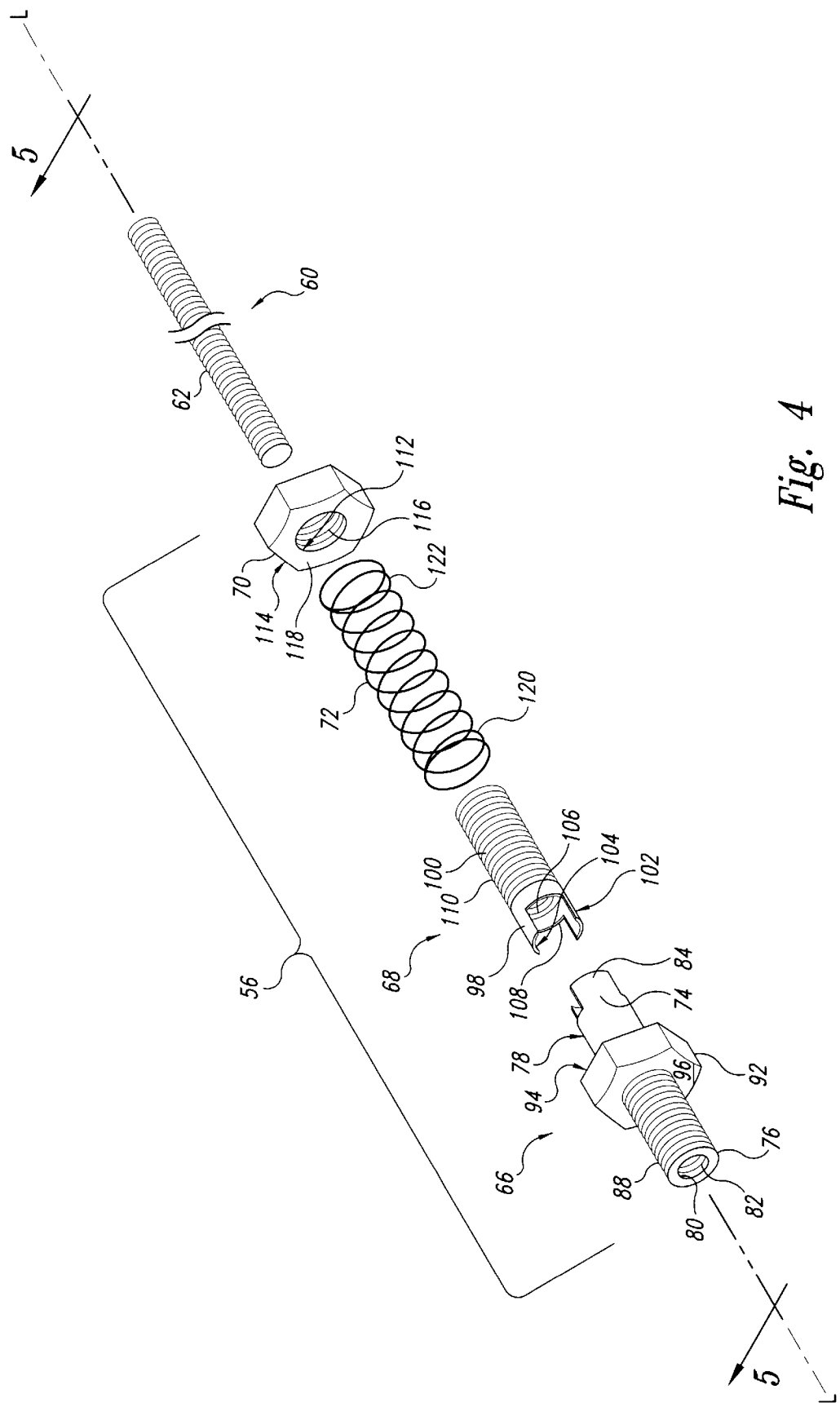
FIG. 4 is an exploded, isometric view of a lead screw aligned with an adjustable nut according to one embodiment of the present invention.
Figure 5:
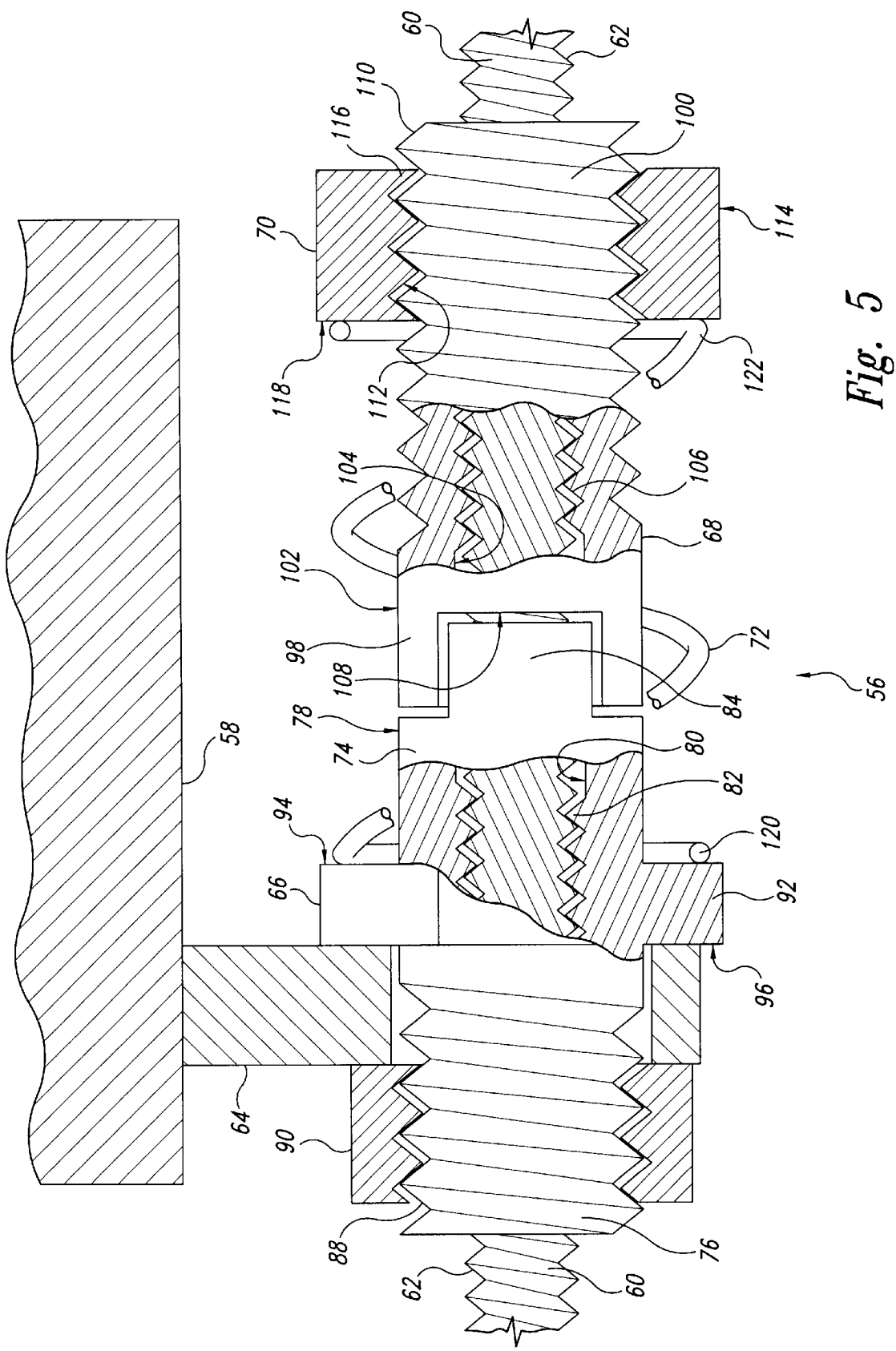
FIG. 5 is a partial cross-sectional view of a moveable work assembly mounted to the lead screw and the adjustable nut of FIG. 4 viewed along Section 5—5.
Figure 6:
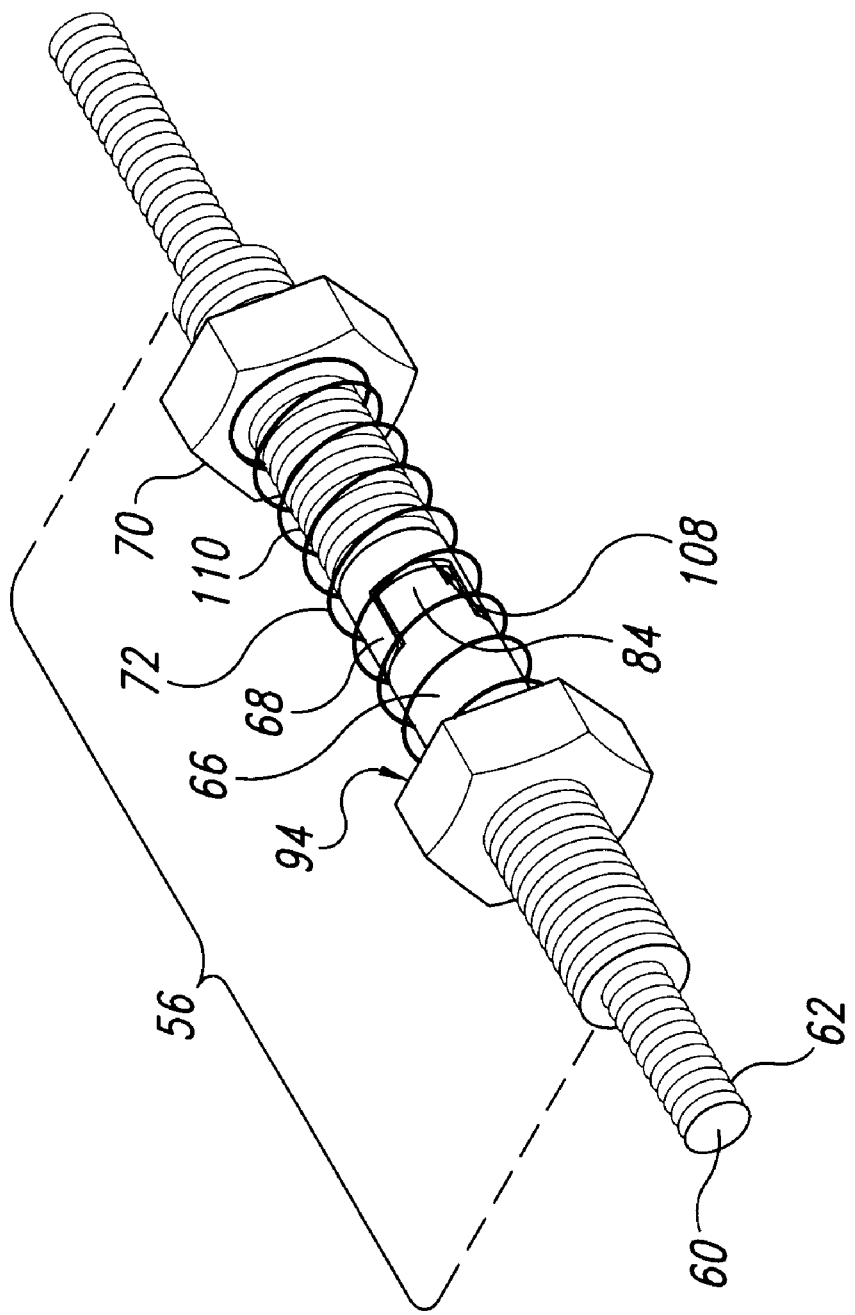
FIG. 6 is an isometric view of the lead screw and the adjustable nut of FIG. 4.

FIGS. 4–6 illustrate one embodiment of an adjustable nut 56 for mounting a movable table 58 (FIG. 5) or another working assembly to a lead screw 60 having an external thread 62. The table 58, for example, may be coupled to the adjustable nut 56 by an arm 64 (FIG. 5). As described in detail below, the adjustable nut 56 can have a first member 66, a second member 68, and an adjustment assembly for driving the first member 66 apart from the second member 68. In the illustrated embodiment, the adjustment assembly includes a third member 70 (e.g., a nut) and a biasing element 72 (e.g., a spring). The third member 70 can be selectively moved along the length of the second member 68 to selectively increase or decrease the force that the biasing element 72 exerts on the first and second members 66, 68 without disassembling the adjustable nut 56. The adjustable nut 56 can thus be used along the entire length of the lead screw 60 regardless of variances in the thread forms along the external thread 62.

As best illustrated in FIGS. 4 and 5, this particular embodiment of the first member 66 has a first end 74, a second end 76 opposite the first end 74, an outer surface 78, and a first bore 80 extending from the first end 74 to the second end 76. The first end 74 terminates in at least one projection 84 for preventing relative rotation between the first member 66 and the second member 68. In the illustrated embodiment, the first end 74 has two projections 84. The first end 74, however, can have more or fewer projections 84, and the projections can have a wide variety of sizes or shapes, such as triangular or curved. The second end 76 has an external thread 88 extending along at least a portion of the first member 66. A locking nut 90 (FIG. 5) can be threaded onto the thread 88 to attach the arm 64 (FIG. 5) to the adjustable nut 56. The first bore 80 has a first internal thread 82 that engages the external thread 62 on the lead screw 60.

The first member 66 also can have a raised section 92 between the first end 74 and the second end 76. The raised second 92 generally has a first contacting surface 94 facing the first end 74 and a seating surface 96 facing the second end 76. In this embodiment, the first contacting surface 94 and the seating surface 96 are flat surfaces projecting radially outward from the first member 66. The contacting and seating surfaces 94 and 96, however, can have other configurations, such as a slope or a curve. The perimeter of the raised section 92 is configured to engage a wrench (not shown) or another type of tool to prevent rotation of the first member 66. In the illustrated embodiment, the perimeter of the raised section 92 has a hexagonal cross-section; the perimeter, however, can also be rounded with opposing flat surfaces for seating the jaws of the wrench, or it can be knurled or coated to allow for an improved grip.

The embodiment of the second member 68 shown in FIGS. 4 and 5 has a first end 98, a second end 100 opposite the first end 98, an outer surface 102, and a second bore 104 extending from the first end 98 to the second end 100. The second bore 104 of this embodiment has a second internal thread 106 configured to engage the external thread 62 on the lead screw 60. The first end 98 can terminate in at least one notch 108 for receiving the projection 84 of the first member 66 to prevent relative rotation between the first member 66 and the second member 68. In the illustrated embodiment, the first end 98 has two rectangular notches 108, but the first end 98 can have more than two notches, and the notches can be triangular, curved, or many other shapes. The second member 68 can alternatively have projections and the first member can have complementary notches, or both members can have alternating teeth that enmesh when the first and second members 66 and 68 abut one another. The second end 100 can have an external adjustment thread 110 extending along at least a portion of the distance from the second end 100 toward the first end 98.

The embodiment of the third member 70 shown in FIGS. 4 and 5 has a third bore 112 and an outer surface 114. The third bore 112 can have a third internal thread 116 that is complementary to the adjustment thread 110 on the second member 68. The third member 70 can also have a second contacting surface 118 that is oriented at least substantially radially with respect to the third bore 112. As best shown in FIG. 4, the outer surface 114 can be configured to engage a wrench (not shown) or another tool. In the illustrated embodiment, the outer surface 114 has a hexagonal cross-section, but the outer surface can also be rounded with opposing flat surfaces for seating the jaws of the wrench, or it can be knurled or coated to allow for an improved grip. The first member 66, the second member 68 and the third member 70 can be manufactured from metal, polymeric or other suitable materials.

The biasing element 72 shown in FIGS. 4 and 5 selectively drives the first and second members 66 and 68 apart from one another along the longitudinal axis L—L (FIG. 4) of the lead screw 60. The biasing element 72 generally has a first end 120, a second end 122 opposite the first end 120, and a length in an unstrained state sufficient to extend from the first contacting surface 94 at least to a point along the adjustment thread 110 when the first and second members 66 and 68 are enmeshed. The biasing element 72 can be metal, plastic or any other suitable material. In the illustrated embodiment, the biasing element 72 is a helical spring, but the biasing element 72 can also be a hollow cylinder or other shape of a resilient foam, rubber or other suitable resiliently compressible materials.

FIG. 5 best illustrates the operation of this embodiment of the adjustable nut 56. When the biasing element 72 is compressed between the first contacting surface 94 of the first member 66 and the second contacting surface 118 of the third member 70, the biasing element 72 drives the first and second members 66 and 68 apart from one another with an axial force acting along the longitudinal axis of the lead screw 60. The axial force from the biasing element 72 thus causes the first internal thread 82 of the first member 66 to push against the external thread 62 in one direction and the second internal thread 106 of the second member 68 to push against the external thread 62 in an opposite direction. As a result, the first and second internal threads 82, 106 maintain constant, positive contact with the external thread 62 so that there is no "play" between the adjustable nut 56 and the lead screw 60 (e.g., all of the rotational displacement of the lead screw 60 converts to axial movement of the adjustable nut 56 along the lead screw 60).

Figure 1:
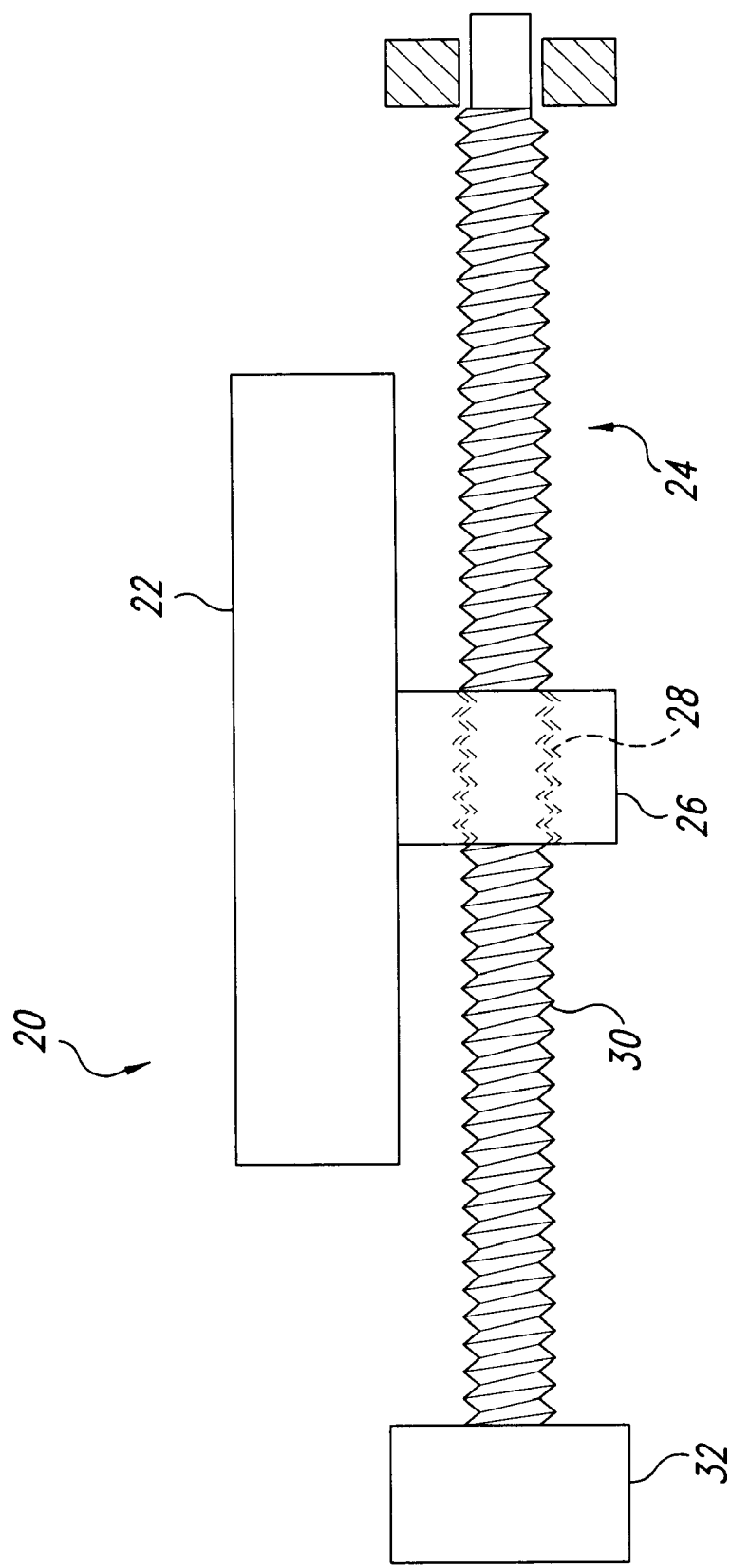
FIG. 1 is a front elevation view of a movable table assembly mounted to a lead screw according to the prior art.
Figure 2:
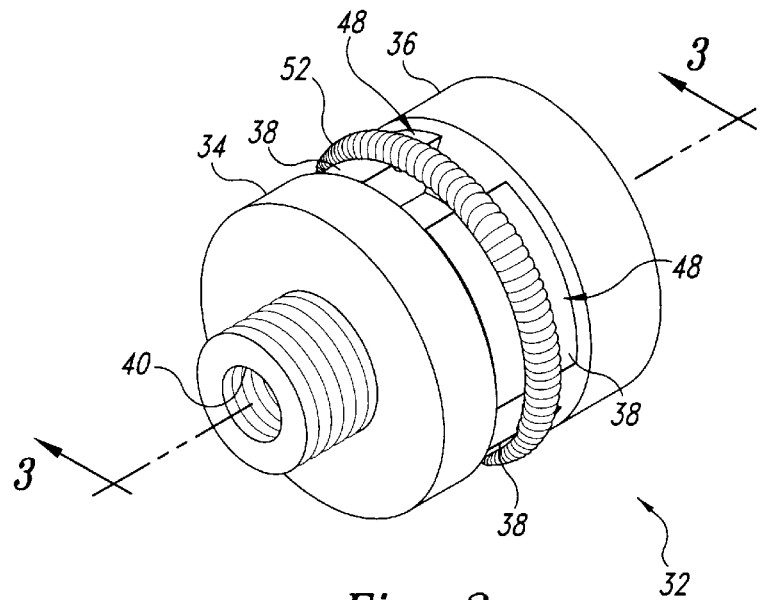
FIG. 2 is an isometric view of a lead screw nut according to the prior art.
Figure 3:
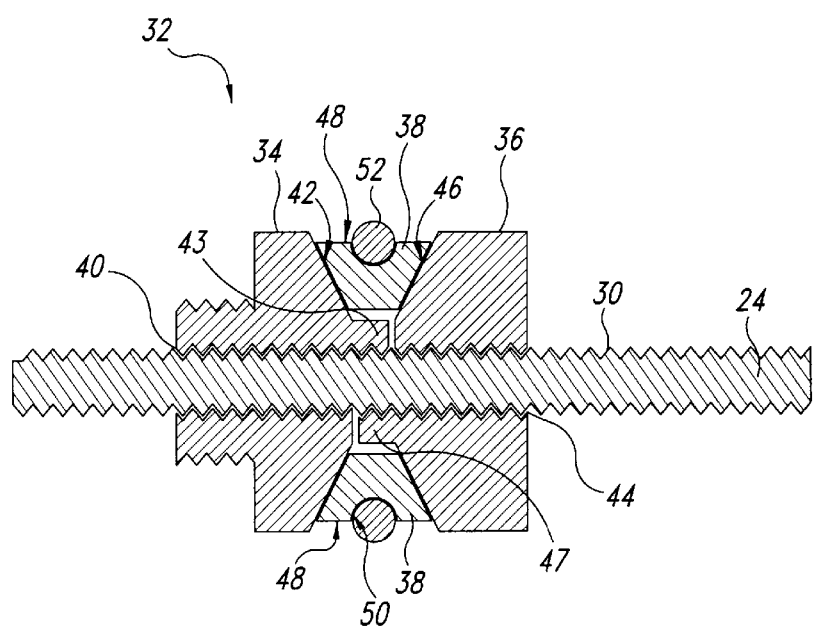
FIG. 3 is a cross-sectional view of a lead screw and the lead screw nut of FIG. 2 viewed along Section 3—3.

The axial force from the biasing element 72 can also be adjusted to allow the adjustable nut 56 to pass over highly-worn and lesser-worn areas of the lead screw 60 without disassembling the adjustable nut 56. For example, as the external thread 62 on the lead screw 60 wears in highly-worn areas, the force exerted by the biasing element 72 drives the first member 66 further apart from the second member 68 to compensate for the increase in distance between the thread forms in such highly-worn areas on the external thread 62. In contrast to the hourglass-shaped nut of the prior art shown in FIGS. 2 and 3, when the adjustable nut 56 moves back to a lesser-worn portion of the lead screw 60, the third member 70 can be moved away from the first member 66 to reduce the axial force between the first and second members 66 and 68. The relative decrease in the distance between the thread forms of the thread 62 from the highly-worn regions to the lesser-worn regions can thus overcome the reduced axial force of the biasing element 72 to move the first and second members 66 and 68 toward each other. The adjustable nut 56 can thus move from highly-worn regions to lesser-worn regions on the lead screw 60 without being disassembled. Moreover, if the adjustable nut 56 must move back over highly-worn regions and the axial force is too low, the third member 70 can be adjusted to compress the biasing element 72 and increase the axial force.

Figure 7:
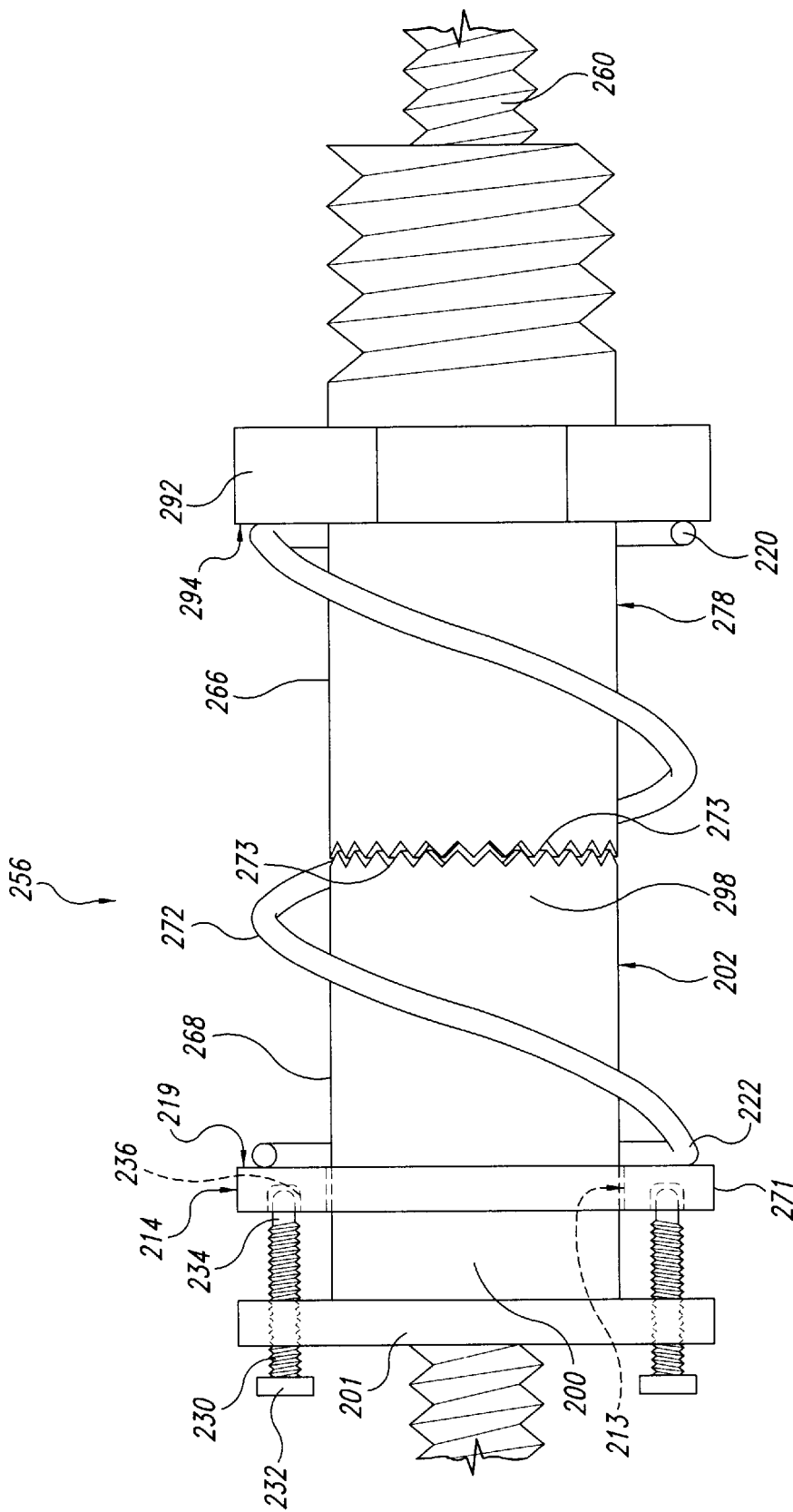
FIG. 7 is a front elevation view of another adjustable nut according to another embodiment of the present invention.

FIG. 7 illustrates an adjustable nut 256 according another embodiment of the present invention. In this embodiment, a first member 266 is coupled to a second member 268 to prevent relative rotation between the first and second members 266 and 268. In the illustrated embodiment, a mating surface on each of the first and second members 266, 268 is formed with a plurality of complementary, radial teeth 273 that enmesh to prevent relative rotation between the first and second members 266, 268. The first member 266 can have an outer surface 278 and a raised portion 292 with a first contacting surface 294 for contacting a biasing element 272. The second member 268 can have an outer surface 202 and at least one radial projection 201. In the illustrated embodiment, the radial projection 201 is an annular flange. The second member 268, however, can also have a plurality of separate radial projections spaced about the perimeter of the outer surface 202. At least one adjustment rod 230 having a proximal end 232 and a distal end 234 is threadably engaged with the radial projection 201. In the illustrated embodiment, two adjustment rods 230 are positioned on opposite radii of the second member 268.

The adjustable nut 256 can also have a third member 271 including two, generally opposing sides and a third bore 213. The third bore 213 is large enough to allow the third member 271 to slide over the outer surface 202 of the second member 268. One side of the third member 271 can have a second contacting surface 219, and the opposite side can have at least one cavity 236 for receiving the distal end 234 of the adjustment rod 230. The biasing element 272 is positioned between the first and third members 266 and 271 so that a first end 220 of the biasing element 272 engages the first contacting surface 294 and a second end 222 of the biasing element 272 engages the second contacting surface 219. The biasing element 272 can accordingly be a spring, a compressible cylinder or other compressibly resilient member similar to the biasing element 72 described above.

The adjustable nut 256 controls the force exerted by the biasing element 272 by extending/retracting the adjustment rods 230 with respect to the radial projection 201. To increase the axial force that the biasing element 272 exerts on the first and second members 266 and 268, the adjustment rods 230 are rotated to move the third member 271 toward the first member 266 and thus increase the restoring force in the biasing element 272. Conversely, to decrease the axial force exerted by the biasing element 272, the adjustment rods 230 are rotated to move the third member 271 away from the first member 266. The movement of the third member 271 accordingly compresses or relaxes the biasing element 272 to control the axial force exerted by the biasing element 272 for moving the nut 256 over highly-worn and lesser-worn areas on a lead screw 260.

Figure 8:
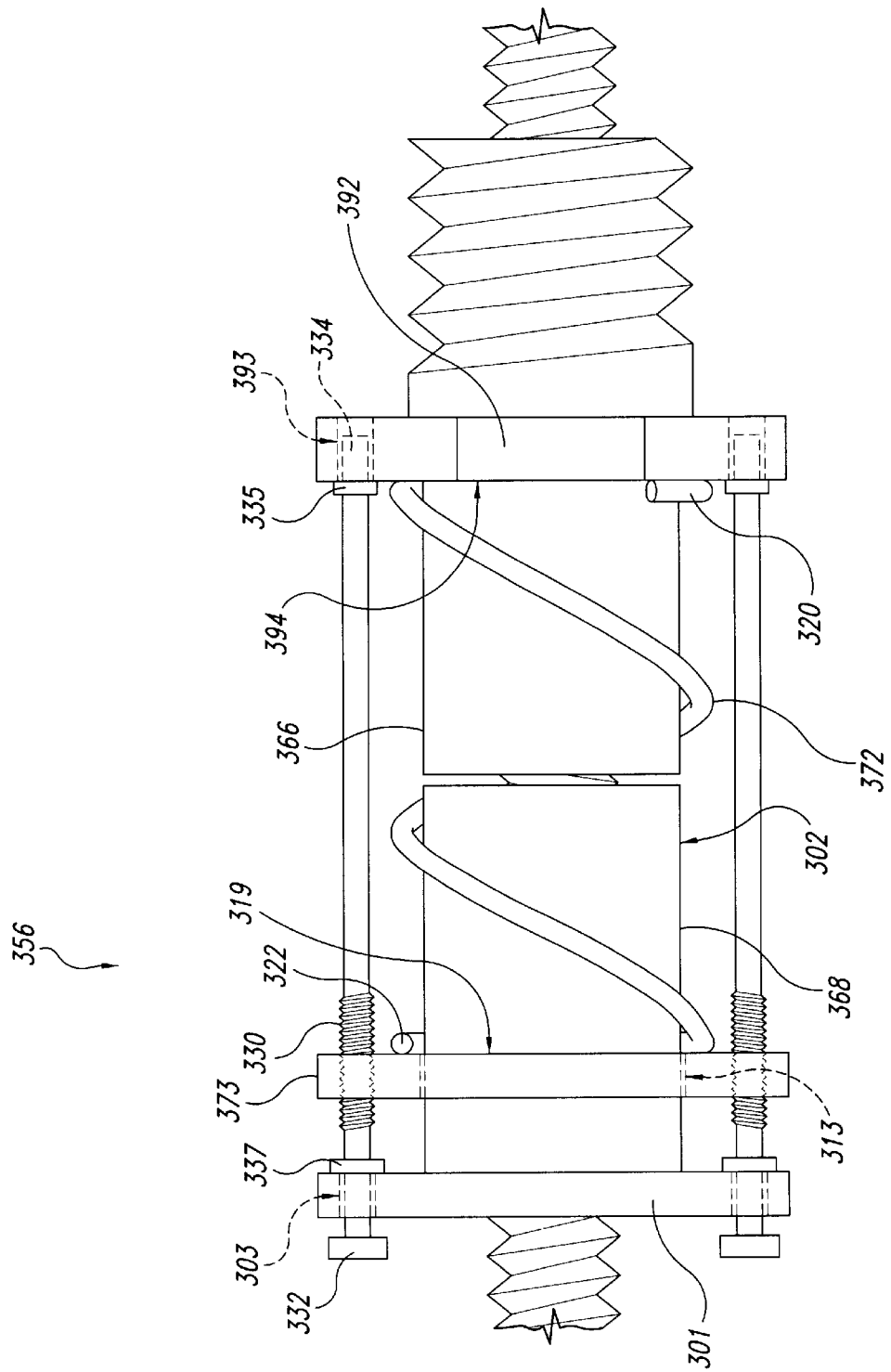
FIG. 8 is a front elevation view of yet another adjustable nut according to yet another embodiment of the present invention.

FIG. 8 illustrates an adjustable nut 356 according to yet another embodiment of the invention. The adjustable nut 356 is similar to the adjustable nut 256, but the adjustable nut 356 can include an adjustment rod 330 extending from a radial projection 301 on a second member 368 to a raised portion 392 on a first member 366. The adjustment rod 330 is threadably engaged with a third member 373 that slides over the second member 368, and a biasing element 372 is positioned between the raised portion 392 and the third member 373.

In this embodiment, the adjustment rod 330 has a first obstruction 335 to prevent the adjustment rod 330 from passing through the raised portion 392 and a second obstruction 337 to prevent the adjustment rod 330 from passing through the radial projection 301. The adjustment rod 330 can accordingly rotate to move the third member 373 along the second member 368 for adjusting the axial force exerted by the biasing element 372.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A nut for mounting a movable working assembly to a lead screw having a longitudinal axis and a thread, the nut comprising:

a first member configured to threadably engage the thread on the lead screw;

a second member configured to threadably engage the thread on the lead screw, the second member being coupled to the first member to restrict relative rotation between the first and second members and to allow axial displacement between the first and second members along the longitudinal axis of the lead screw; and an adjustment assembly including a biasing element coupled to the first and second members to exert an axial drive force with respect to the longitudinal axis of the lead screw that drives the first and second members apart from one another, the biasing element being selectively adjustable to increase/decrease the axial drive force without disassembling the biasing element from the first and second members.

2. The nut of claim 1, wherein the first member comprises an axial projection and the second member comprises a complementary notch positioned to closely receive the axial projection when the first member is at least substantially abutted with the second member.

3. The nut of claim 1, wherein the first member comprises a plurality of first teeth and the second member comprises a plurality of complementary second teeth positioned to engage the first teeth when the first member is at least substantially abutted with the second member.

4. The nut of claim 3, wherein the teeth are oriented radially with respect to the longitudinal axis of the lead screw.

5. The nut of claim 1, wherein:

the first member has a first contact surface;

the adjustment assembly further comprises a third member threadably engaged with the second member, the third member having a second contact surface facing the first contact surface; and the biasing element extends between the first and second contact surfaces to exert the axial drive force against the first and second contact surfaces, the third member being rotatable with respect to the second member to move the third member axially with respect to the first contact surface for increasing/decreasing the axial drive force exerted by the biasing element.

6. The nut of claim 5, wherein the biasing element is a spring.

7. The nut of claim 5, wherein the biasing element comprises a resilient sleeve having a bore, and wherein at least a portion of the first and second members are received in the bore of the resilient sleeve.

8. The nut of claim 7, wherein the biasing element comprises rubber.

9. The nut of claim 7, wherein the biasing element comprises foam.

10. The nut of claim 1, wherein:

the first member has a first contact surface;

the second member has at least one radial projection;

the adjustment assembly further comprises a third member configured to slidably engage the second member, the third member is adjustably coupled to the radial projection to move axially with respect to the longitudinal axis of the lead screw, and the third member has a second contact surface facing the first contact surface, and the biasing element extends between the first and second contact surfaces to exert the axial drive force against the first and second contact surfaces, the third member being movable axially with respect to the longitudinal axis of the lead screw toward/away from the radial projection to increase/decrease the drive force exerted by the biasing element.

11. The nut of claim 10, further comprising an adjustment rod threadably attached to the radial projection, wherein rotation of the adjustment rod moves the rod and the third member axially with respect to the longitudinal axis of the lead screw with respect to the second member to increase/decrease the axial drive force exerted by the biasing element.

12. The nut of claim 10, further comprising an adjustment rod threadably attached to the third member, wherein rotation of the adjustment rod moves the third member longitudinally with respect to the second member to increase/decrease the axial drive force exerted by the biasing element.

13. The nut of claim 1, wherein the first member includes a first lateral projection having a first hole aligned with the bore, the second member includes a second lateral projection having a second hole configured to align with the first hole, and the adjustment assembly has an elongated member adjustably engaged with the first and second holes.

14. A nut for mounting a movable working assembly to a lead screw having a longitudinal axis and a thread, the nut comprising:

a bore configured to threadably engage the thread on the lead screw;

a first portion configured to engage a first location on the lead screw;

a second portion configured to engage a second location on the lead screw, the second portion of the nut being slidably coupled to the first portion to allow relative movement between the first and second portions in the direction of the longitudinal axis of the lead screw and to prevent relative rotation between the first and second portions; and an adjustable biasing assembly having a first end and a second end, the first end of the adjustable biasing assembly coupled to the first portion of the nut and the second end of the adjustable biasing assembly coupled to the second portion of the nut to create a restoring force in the adjustable biasing assembly to urge the first portion of the nut longitudinally along the lead screw in a first direction against the thread at the first location on the lead screw and to urge the second portion of the nut longitudinally along the lead screw in a second direction opposite the first direction against the thread at the second location on the lead screw, the adjustable biasing assembly being selectively adjustable to increase/decrease the restoring force without disassembling the adjustable biasing assembly from the first and second members.

15. The nut of claim 14, wherein:

the first portion of the nut has a first contact surface; and the adjustable biasing assembly includes an adjustment member and a biasing element, the adjustment member threadably engages the second portion of the nut and the adjustment member has a second contact surface facing the first contact surface, the biasing element extends between the first and second contact surfaces to exert the restoring force against the first and second contact surfaces, and the adjustment member being rotatable with respect to the second portion of the nut to move the adjustment member axially with respect to the lead screw for increasing/decreasing the restoring force exerted by the adjustable biasing assembly.

16. The nut of claim 14, wherein:

the first portion of the nut has a first contact surface;

the second portion of the nut has at least one radial projection; and the adjustable biasing assembly includes an adjustment member and a biasing element, the adjustment member slidably engages the second portion of the nut and the adjustment member is moveably coupled to the radial projection to move axially with respect to the longitudinal axis of the lead screw, the adjustment member has a second contact surface facing the first contact surface, the biasing element extends between the first and second contact surfaces to exert the restoring force against the first and second contact surfaces, and the adjustment member is axially moveable with respect to the radial projection to increase/decrease the restoring force exerted by the biasing element.

17. The nut of claim 16, further comprising an adjustment rod threadably attached to the radial projection and engaged with the adjustment member, wherein rotation of the adjustment rod moves the adjustment member longitudinally with respect to the second portion of the nut to increase/decrease the restoring force exerted by the biasing element.

18. The nut of claim 16, further comprising an adjustment rod threadably attached to the adjustment member, wherein rotation of the adjustment rod moves the adjustment member longitudinally with respect to the second portion of the nut to increase/decrease the restoring force exerted by the biasing element.

19. The nut of claim 14, wherein the first portion of the nut has a first lateral projection having a first hole aligned with the bore, the second portion of the nut has a second lateral projection having a second hole configured to align with the first hole, and the adjustable biasing assembly has an elongated member adjustably engaged with the first and second holes.

20. A nut for mounting a movable working assembly to a lead screw having a longitudinal axis and a thread, the nut comprising:

a first member configured to threadably engage the thread on the lead screw;

a second member configured to threadably engage the thread on the lead screw, the second member being coupled to the first member to restrict relative rotation between the first and second members and to allow axial displacement between the first and second members in the direction of the longitudinal axis of the lead screw; and an adjustment assembly including a compression element coupled to the first and second members, the compression element being compressed axially with respect to the longitudinal axis of the lead screw to exert an axial drive force against the first and second members that drives the first and second members apart from one another in the direction of the longitudinal axis of the lead screw, the compression element being selectively adjustable to increase/decrease the axial drive force.

21. A drive system for moving a working assembly, the system comprising:

a rotatable lead screw;

a first member configured to threadably engage the thread on the lead screw;

a second member configured to threadably engage the thread on the lead screw, the second member being coupled to the first member to restrict relative rotation between the first and second members and to allow axial displacement between the first and second members along the longitudinal axis of the lead screw;

an adjustment assembly including a biasing element coupled to the first and second members to exert an axial drive force with respect to the longitudinal axis of the lead screw that drives the first and second members apart from one another, the biasing element being selectively adjustable to increase or decrease the axial drive force without disassembling the biasing element from the first and second members.

22. The system of claim 21, wherein the first member comprises an axial projection and the second member comprises a complementary notch positioned to closely receive the axial projection when the first member is at least substantially abutted with the second member.

23. The system of claim 21, wherein the first member comprises a plurality of first teeth and the second member comprises a plurality of complementary second teeth positioned to engage the first teeth when the first member is at least substantially abutted with the second member.

24. The system of claim 23, wherein the teeth are oriented radially.

25. The system of claim 21, wherein the second member further comprises a thread and the adjustment assembly further comprises a third member having a bore configured to threadably engage the thread on the second member, the first member having a first contact surface, the third member having a second contact surface facing the first contact surface, and the biasing element extending between the first and second contact surfaces such that rotation of the third member with respect to the second member increases/decreases the drive force exerted by the biasing element.

26. The system of claim 21, wherein the second member further comprises at least one radial projection and the adjustment assembly further comprises a third member adjustably coupled to the radial projection, the third member having a bore configured to slidably engage the second member, the first member having a first contact surface, the third member having a second contact surface facing the first contact surface, and the biasing element extending between the first and second contact surfaces such that adjustment of the third member with respect to the radial projection increases/decreases the drive force exerted by the biasing element.

27. The system of claim 26, further comprising an adjustment rod threadably attached to the radial projection, wherein rotation of the adjustment rod moves the third member longitudinally with respect to the second member to increase/decrease the axial drive force exerted by the biasing element.

28. The system of claim 26, further comprising an adjustment rod threadably attached to the third member, wherein rotation of the adjustment rod moves the third member longitudinally with respect to the second member to increase/decrease the axial drive force exerted by the biasing element.

29. The system of claim 21, wherein the biasing element comprises a spring.

30. The system of claim 21, wherein the biasing element comprises a resilient sleeve having a bore, the bore having a diameter large enough to encircle the outer surfaces of the first and second members.

31. The system of claim 30, wherein the biasing element comprises rubber.

32. The system of claim 30, wherein the biasing element comprises foam.

* * * * *